(12) United States Patent
Marshall

(10) Patent No.: US 11,240,773 B2
(45) Date of Patent: Feb. 1, 2022

(54) MANAGING DOPPLER AND FRAMING IMPACTS IN NETWORKS

(71) Applicant: Google LLC, Mountain View, CA (US)

(72) Inventor: Preston Marshall, Woodbridge, VA (US)

(73) Assignee: Google LLC, Mountain View, CA (US)

( * ) Notice: Subject to any disclaimer, the term of this patent is extended or adjusted under 35 U.S.C. 154(b) by 614 days.

(21) Appl. No.: 16/213,663

(22) Filed: Dec. 7, 2018

(65) Prior Publication Data
US 2022/0007322 A1 Jan. 6, 2022

(51) Int. Cl.
*H04W 4/00* (2018.01)
*H04W 56/00* (2009.01)
*H04W 64/00* (2009.01)
*H04J 3/06* (2006.01)

(52) U.S. Cl.
CPC ....... *H04W 56/0035* (2013.01); *H04J 3/0667* (2013.01); *H04W 56/001* (2013.01); *H04W 56/0055* (2013.01); *H04W 64/006* (2013.01)

(58) Field of Classification Search
CPC ........... H04W 56/0035; H04W 64/006; H04W 56/001; H04W 56/0055; H04W 24/10; H04J 3/0667; G01S 19/071; G01S 19/215; H04B 7/01; H04B 7/18506
USPC ...................................................... 455/433
See application file for complete search history.

(56) References Cited

U.S. PATENT DOCUMENTS

| | | | |
|---|---|---|---|
| 6,201,973 B1 * | 3/2001 | Kowaguchi ............... | G01S 5/10 342/357.52 |
| 6,445,344 B1 * | 9/2002 | Wise ..................... | G01C 21/165 342/450 |
| 8,035,557 B2 * | 10/2011 | Thomson ............... | G01S 19/215 342/357.59 |

(Continued)

FOREIGN PATENT DOCUMENTS

| | | | | |
|---|---|---|---|---|
| DE | 3841864 A1 * | 6/1990 | ......... | G01S 13/5242 |
| RU | 2627550 C1 * | 8/2017 | | |
| WO | WO-2011067907 A1 * | 6/2011 | ......... | H04L 27/2665 |

OTHER PUBLICATIONS

"An Introduction to Wireless Sensor Networks" Carlo Fischione, Sep. 2014.

*Primary Examiner* — Mahendra R Patel
(74) *Attorney, Agent, or Firm* — Honigman LLP; Brett A. Krueger

(57) ABSTRACT

A method includes receiving a current velocity and a current position of a mobile node relative to a fixed node. The method also includes identifying a receive time slot for the fixed node to receive a transmission of a data packet from the mobile node and determining a propagation delay for the data packet between the mobile node and the fixed node based on the current position of the mobile node. The method includes determining a transmission time based on the receive time slot and the propagation delay and determining a Doppler shift based on the current velocity of the mobile node. The method includes determining a transmission frequency based on the Doppler shift and a clock rate correction. The method also includes transmitting the data packet to the fixed node at the determined transmission time using the determined transmission frequency compensated by the determined clock rate correction.

20 Claims, 7 Drawing Sheets

(56) References Cited

U.S. PATENT DOCUMENTS

| | | | | |
|---|---|---|---|---|
| 8,599,956 B1* | 12/2013 | Mitchell | H04W 56/0035 | 375/285 |
| 8,868,069 B2* | 10/2014 | Bennett | H04B 7/18506 | 455/431 |
| 9,179,328 B2* | 11/2015 | Li | H04W 24/02 | |
| 9,749,035 B2* | 8/2017 | Vasavada | H04W 56/00 | |
| 9,998,310 B2* | 6/2018 | Barbieri | H04L 27/0002 | |
| 10,454,533 B1* | 10/2019 | Kogiantis | H04L 27/266 | |
| 10,536,959 B2* | 1/2020 | Barabell | H04B 17/318 | |
| 2004/0248519 A1* | 12/2004 | Niemela | H04B 7/015 | 455/67.11 |
| 2006/0039236 A1* | 2/2006 | Norwood | G01S 15/00 | 367/13 |
| 2006/0064244 A1* | 3/2006 | Robbins | G01S 19/071 | 701/471 |
| 2007/0021122 A1* | 1/2007 | Lane | H04W 4/029 | 455/441 |
| 2007/0159384 A1* | 7/2007 | Kangas | G01S 19/40 | 342/357.23 |
| 2009/0029657 A1* | 1/2009 | Sakaishi | H04W 56/0035 | 455/113 |
| 2010/0304699 A1* | 12/2010 | Walker | H04L 1/20 | 455/226.3 |
| 2011/0007707 A1* | 1/2011 | Kazmi | H04W 56/0005 | 370/331 |
| 2011/0117903 A1* | 5/2011 | Bradley | H04W 4/02 | 455/418 |
| 2011/0227574 A1* | 9/2011 | Akita | G01R 33/3692 | 324/322 |
| 2013/0070822 A1* | 3/2013 | Takahashi | H04L 27/2657 | 375/219 |
| 2016/0054440 A1* | 2/2016 | Younis | G01S 13/756 | 342/5 |
| 2018/0199299 A1* | 7/2018 | Wakabayashi | H04W 56/002 | |
| 2019/0353800 A1* | 11/2019 | Nirula | G01S 19/29 | |

* cited by examiner

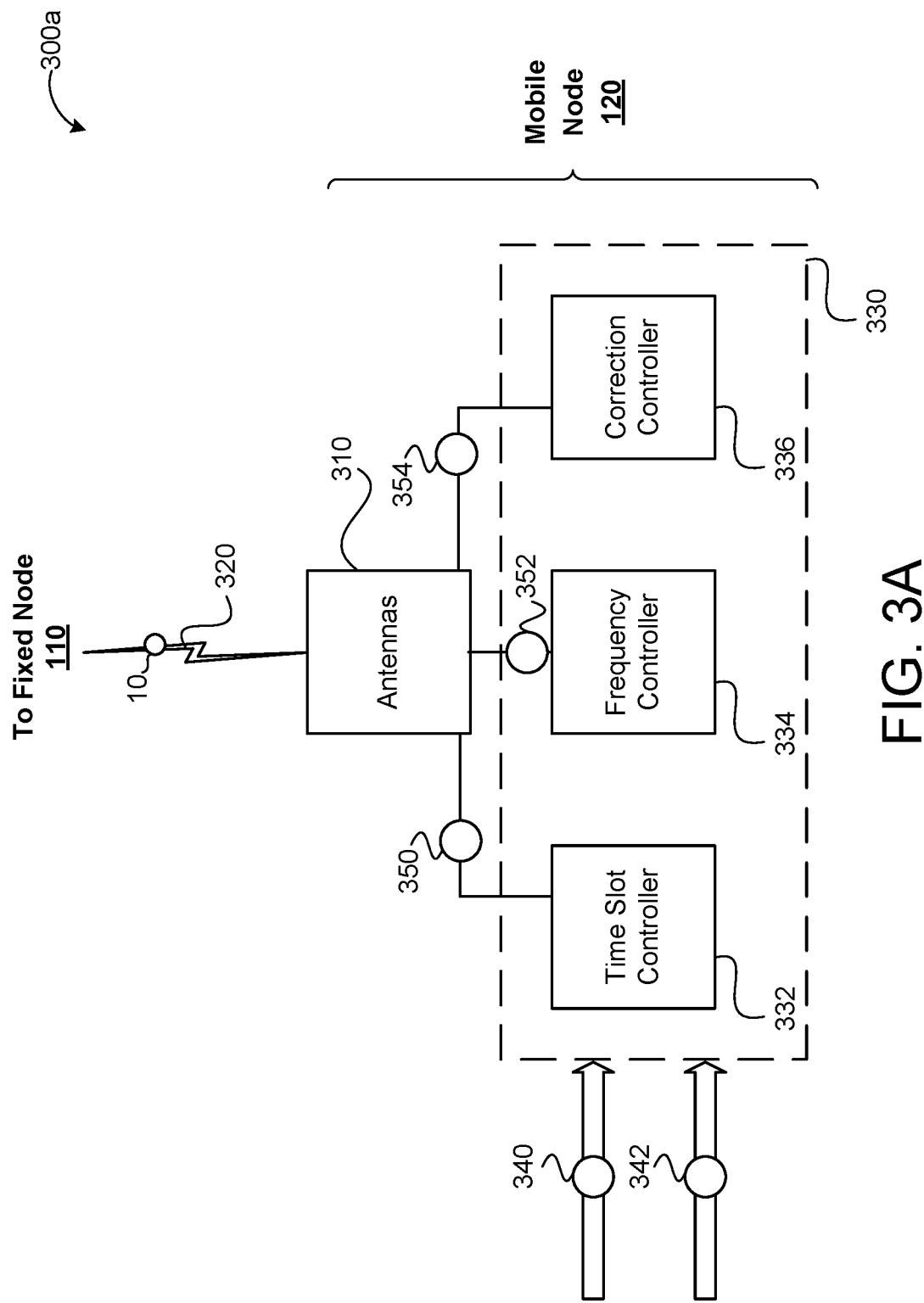

MANAGING DOPPLER AND FRAMING IMPACTS IN NETWORKS

TECHNICAL FIELD

This disclosure relates to managing Doppler and framing impacts in networks.

BACKGROUND

Communications between nodes with high relative velocity cause signals to be received at different frequencies than transmitted, and changes in receiver to transmitter distances within one timing cycle will change the perceived clock rate at the receiver. There are many waveform designs that include features that address Doppler and other velocity related issues. For any given pilot symbol population, there is a specific limit to the Doppler that can be addressed and the link will fail beyond that limit.

SUMMARY

One aspect of the disclosure provides receiving, at data processing hardware of a mobile node, a current velocity of the mobile node and a current position of the mobile node relative to a fixed node. The mobile node is moving toward or away from the fixed node. The method also includes identifying, by the data processing hardware, a receive time slot for the fixed node to receive a transmission of a data packet from the mobile node and determining, by the data processing hardware, a propagation delay for the data packet between the mobile node and the fixed node based on the current position of the mobile node relative to the fixed node. The method also includes determining, by the data processing hardware, a transmission time based on the identified receive time slot and the determined propagation delay and determining, by the data processing hardware, a Doppler shift based on the current velocity of the mobile node. The method also includes determining, by the data processing hardware, a transmission frequency based on the determined Doppler shift and determining, by the data processing hardware, a clock rate correction. The clock rate correction accounts for a change in the propagation delay during transmission of the data packet. The method also includes transmitting, by the data processing hardware, the data packet to the fixed node at the determined transmission time using the determined transmission frequency compensated by the determined clock rate correction.

Implementations of the disclosure may include one or more of the following optional features. In some implementations, determining the transmission time includes subtracting the propagation delay from the identified receive time slot. In some examples, determining the transmission frequency includes adding the Doppler shift to a base transmission frequency or subtracting the Doppler shift from the base transmission frequency. Determining the clock rate correction may include estimating an end position of the mobile node. The end position is a position of the mobile node relative to the fixed node at the end of transmitting the data packet. Determining the clock rate correction may also include determining a difference between the current position of the mobile node and the end position of the mobile node and determining the clock rate correction based on the determined difference between the current position of the mobile node and the end position of the mobile node. Determining the clock rate correction, in some implementations, further includes adjusting a symbol rate of the data packet based on the determined difference between the current position of the mobile node and the end position of the mobile node. The adjusted symbol rate may be equivalent to a symbol count of an uncorrected waveform.

Another aspect of the disclosure provides receiving, at data processing hardware of a fixed node, a current velocity of a mobile node and a current position of the mobile node relative to the fixed node. The mobile node is moving toward or away from the fixed node. The method also includes identifying, by the data processing hardware, a receive time slot for the fixed node to receive a transmission of a data packet from the mobile node and determining, by the data processing hardware, a propagation delay for the data packet between the mobile node and the fixed node based on the current position of the mobile node relative to the fixed node. The method also includes determining, by the data processing hardware, a reception time based on the identified receive time slot and the determined propagation delay and determining, by the data processing hardware, a Doppler shift based on the current velocity of the mobile node. The method also includes determining, by the data processing hardware, a reception frequency based on the determined Doppler shift and determining, by the data processing hardware, a clock rate correction. The clock rate correction accounts for a change in the propagation delay during transmission of the data packet. The method also includes transmitting, by the data processing hardware, the data packet to the mobile node at the determined reception time using the determined reception frequency compensated by the determined clock rate correction.

This aspect may include one or more of the following optional features. In some implementations, determining the reception time includes subtracting the propagation delay from the identified receive time slot. In some examples, determining the reception frequency includes adding the Doppler shift to a base reception frequency or subtracting the Doppler shift from the base reception frequency. Determining the clock rate correction may include estimating an end position of the mobile node. The end position is a position of the mobile node relative to the fixed node at the end of transmitting the data packet. Determining the clock rate correction may also include determining a difference between the current position of the mobile node and the end position of the mobile node and determining the clock rate correction based on the determined difference between the current position of the mobile node and the end position of the mobile node. Determining the clock rate correction, in some implementations, further includes adjusting a symbol rate of the data packet based on the determined difference between the current position of the mobile node and the end position of the mobile node. The adjusted symbol rate may be equivalent to a symbol count of an uncorrected waveform.

Another aspect of the disclosure provides a system that includes data processing hardware of a mobile node and memory hardware in communication with the data processing hardware. The memory hardware stores instructions that when executed on the data processing hardware cause the data processing hardware to perform operations that include receiving a current velocity of the mobile node and a current position of the mobile node relative to a fixed node. The mobile node is moving toward or away from the fixed node. The method also includes identifying a receive time slot for the fixed node to receive a transmission of a data packet from the mobile node and determining a propagation delay for the data packet between the mobile node and the fixed node based on the current position of the mobile node relative to the fixed node. The method also includes determining a transmission time based on the identified receive time slot and the determined propagation delay and determining a Doppler shift based on the current velocity of the mobile node. The method also includes determining a transmission frequency based on the determined Doppler shift and determining a clock rate correction. The clock rate correction accounts for a change in the propagation delay during transmission of the data packet. The method also includes transmitting the data packet to the fixed node at the determined transmission time using the determined transmission frequency compensated by the determined clock rate correction.

This aspect may include one or more of the following optional features. In some implementations, determining the transmission time includes subtracting the propagation delay from the identified receive time slot. In some examples, determining the transmission frequency includes adding the Doppler shift to a base transmission frequency or subtracting the Doppler shift from the base transmission frequency. Determining the clock rate correction may include estimating an end position of the mobile node. The end position is a position of the mobile node relative to the fixed node at the end of transmitting the data packet. Determining the clock rate correction may also include determining a difference between the current position of the mobile node and the end position of the mobile node and determining the clock rate correction based on the determined difference between the current position of the mobile node and the end position of the mobile node. Determining the clock rate correction, in some implementations, further includes adjusting a symbol rate of the data packet based on the determined difference between the current position of the mobile node and the end position of the mobile node. The adjusted symbol rate may be equivalent to a symbol count of an uncorrected waveform.

Another aspect of the disclosure provides a system that includes data processing hardware of a fixed node and memory hardware in communication with the data processing hardware. The memory hardware stores instructions that when executed on the data processing hardware cause the data processing hardware to perform operations that include receiving a current velocity of the mobile node and a current position of the mobile node relative to a fixed node. The mobile node is moving toward or away from the fixed node. The method also includes identifying a receive time slot for the fixed node to receive a transmission of a data packet from the mobile node and determining a propagation delay for the data packet between the mobile node and the fixed node based on the current position of the mobile node relative to the fixed node. The method also includes determining a reception time based on the identified receive time slot and the determined propagation delay and determining a Doppler shift based on the current velocity of the mobile node. The method also includes determining a reception frequency based on the determined Doppler shift and determining a clock rate correction. The clock rate correction accounts for a change in the propagation delay during transmission of the data packet. The method also includes transmitting the data packet to the mobile node at the determined reception time using the determined reception frequency compensated by the determined clock rate correction.

This aspect may include one or more of the following optional features. In some implementations, determining the reception time includes subtracting the propagation delay from the identified receive time slot. In some examples, determining the reception frequency includes adding the Doppler shift to a base reception frequency or subtracting the Doppler shift from the base reception frequency. Determining the clock rate correction may include estimating an end position of the mobile node. The end position is a position of the mobile node relative to the fixed node at the end of transmitting the data packet. Determining the clock rate correction may also include determining a difference between the current position of the mobile node and the end position of the mobile node and determining the clock rate correction based on the determined difference between the current position of the mobile node and the end position of the mobile node. Determining the clock rate correction, in some implementations, further includes adjusting a symbol rate of the data packet based on the determined difference between the current position of the mobile node and the end position of the mobile node. The adjusted symbol rate may be equivalent to a symbol count of an uncorrected waveform.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A is a schematic view of an exemplary communication array of a mobile node.

Like reference symbols in the various drawings indicate like elements.

DETAILED DESCRIPTION

Communications between two or more nodes with high relative velocity cause signals communicated between the nodes to be received by the receiver node at a frequency different from the transmission frequency and changes in distance between the transmitter node and the receiver node within one timing cycle also changes the perceived clock rate at the receiver node. Additionally, the distance between the two nodes causes transmissions to collide at the receiver node in a time-synchronized network. These effects cause both failure of the intended communications and interference with other communications. Traditionally, these issues in communications networks with moving nodes are addressed by providing extensive additional timing information in the signal to enable the receiver node to track and compensate for these effects. For instance, these traditional solutions include embedding pilot symbols throughout the transmitted block in order to provide the receiver the information required to track Doppler shift and timing changes. However, this compensation adds overhead to the signal, which reduces the throughput, complicates receiver design, and increases processing overhead. Further, this approach still fails to directly compensate for collisions in time synchronized networks. Instead, collisions are addressed by expanding guard times to accommodate worst case ranges of propagation delay due to the speed of light. Some waveforms and access methods define a maximum velocity difference and propagation delay for which the waveform or method is designed. For example, a waveform may have pilot symbols embedded throughout a transmitted block in order to provide the receiver the information required to track Doppler shift and timing changes. Expanding these limits may be possible, but such expansion further reduces the effectiveness of the system, while simultaneously adding additional complexity. Thus, many communications systems are designed for a very limited range of operation, and fail to operate once outside of these limits. These communication systems are inflexible and any extension requires significant engineering. For example, the Long-Term Evolution (LTE) standard required a unique version to be designed when transitioning from automobiles to high-speed trains in order to increase the Doppler range, as the speed increase from automobiles to trains rendered the version ineffective.

Figure 1:
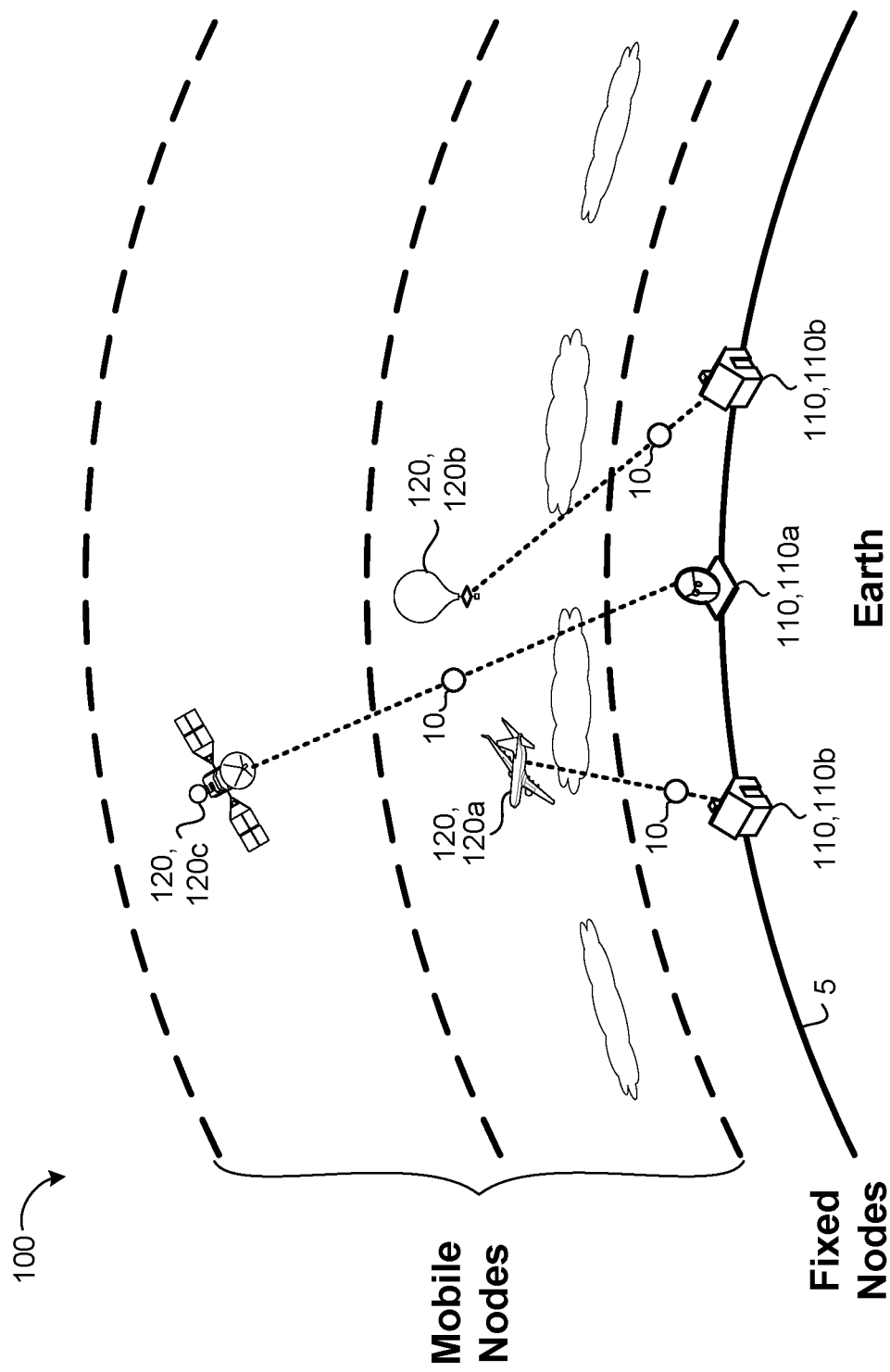
FIG. 1 is a schematic view of an exemplary communication system.

Referring to FIG. 1, in some implementations, a global-scale communication system 100 includes gateways or fixed nodes 110 (e.g., source ground stations 110a and destination ground stations 110b) and mobile nodes 120 (e.g., aircraft 120a, high altitude platforms (HAPs) 120b, and satellites 120c). The fixed nodes 110 communicate with the mobile nodes 120 (i.e., transmit and receive data packets or data blocks 10) while the mobile nodes 120 are moving (either toward or away from the fixed node 110). The mobile nodes 120 may have a high relative velocity with respect to the fixed nodes 110. In some examples, the source ground stations 110a may communicate with the satellites 120c, the satellites 120c may communicate with the HAPs 120b, and the HAPs 120b may communicate with the destination ground stations 110b. In some examples, the source ground stations 110a also operate as linking-gateways between satellites 120c. The source ground stations 110a may be connected to one or more service providers and the destination ground stations 110b may be user terminals (e.g., mobile devices, residential WiFi devices, home networks, etc.). In some implementations, a HAP 120b is an aerial communication device that operates at high altitudes (e.g., 17-22 km). The HAP 120b may be released into the earth's atmosphere, e.g., by an air craft, or flown to the desired height. Moreover, the HAP 120b may operate as a quasi-stationary aircraft. In some examples, the HAP 120b is an aircraft 120a, such as an unmanned aerial vehicle (UAV); while in other examples, the HAP 120b is a communication balloon 120b. The satellite 120c may be in Low Earth Orbit (LEO), Medium Earth Orbit (MEO), or High Earth Orbit (HEO), including Geosynchronous Earth Orbit (GEO).

The HAPs 120b and satellites 120c may move about the earth 5 along a path, trajectory, or orbit (also referred to as a plane, since their orbit or trajectory may approximately form a geometric plane). Moreover, several HAPs 120b or satellites 120c may operate in the same or different orbits. Multiple satellites 120c working in concert form a satellite constellation. The satellites 120c within the satellite constellation may operate in a coordinated fashion to overlap in ground coverage.

Figure 2:
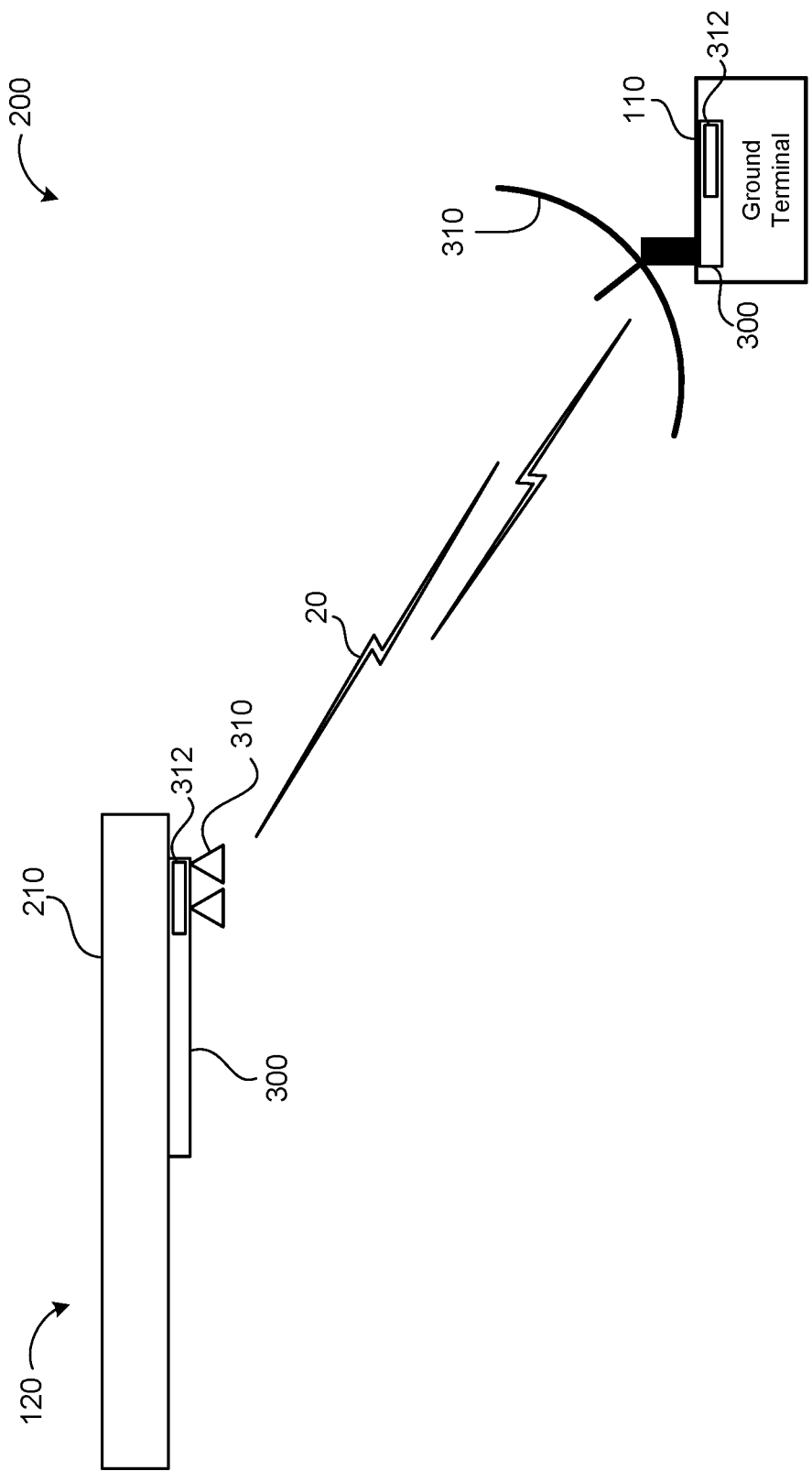
FIG. 2 is a schematic view of an exemplary communication system that includes a mobile node and a fixed node.

FIG. 2 provides a schematic view of an exemplary architecture of a communication system 200 establishing a communications link between a mobile node 120 and a fixed node 110 (e.g., a ground terminal 110). In the example shown, the mobile node 120 includes a body 210 that supports a communication array 300, 300a, which can communicate with the ground station 110 through a communication 20 (e.g., radio signals or electromagnetic energy) using antennas 310. The ground station 110 includes an antenna 310 designed to communicate with the mobile node 120 and may also include a communication array 300b (that includes antenna 310). That is, either or both the mobile node 120 and the fixed node 110 may include the communication array 300. The communication array 300 includes data processing hardware 312 for processing the receiving and transmitting of data 10 via communications 20. The mobile node 120 may communicate various data and information to the fixed node 110, such as, but not limited to, airspeed, heading, attitude position, temperature, GPS (global positioning system) coordinates, wind conditions, flight plan information, fuel quantity, battery quantity, data received from other sources, data received from other antennas, sensor data, etc. As used herein, the terms "data 10", "data packets 10", and block are used interchangeably. The ground station 110 may communicate to the mobile node 120 various data and information, such as, but not limited to, flight directions, flight condition warnings, control inputs, requests for information, requests for sensor data, data to be retransmitted via other antennas or systems, etc. The mobile node 120 may be various implementations of flying craft including, but not limited to, an airplane, airship, helicopter, gyrocopter, blimp, multi-copter, glider, balloon, fixed wing, rotary wing, rotor aircraft, lifting body, heavier than air craft, lighter than air craft, etc.

The fixed node 110 and the mobile node 120 may communicate with any appropriate communication method. For example, the nodes 110, 120 may communicate using time-division multiplexing (TDM). In TDM, the time domain is divided into several recurrent time slots of typically fixed length, one time slot for each sub-channel of the communication channel. Thus, one node (e.g., a fixed node 110) may communicate with many other nodes (e.g., mobile nodes 120) simultaneously over the same communication channel while efficiently using the available bandwidth. Such systems generally agree on a fixed block size (i.e., the size of each data transmission) and a fixed frequency (i.e., a base frequency).

Figure 3B:
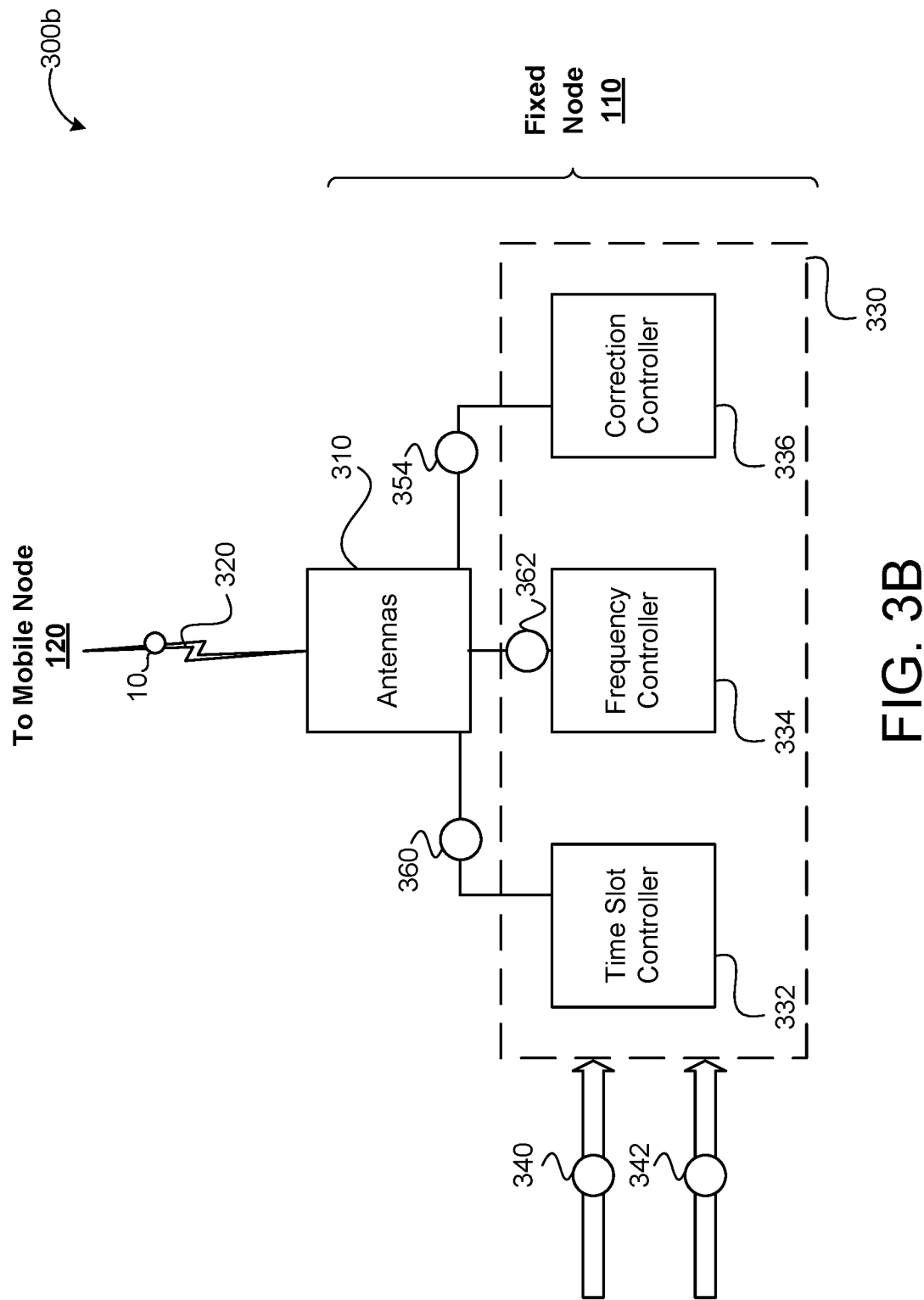
FIG. 3B is a schematic view of an exemplary communication array of a fixed node.

One of the challenges associated with establishing a communication system between a mobile node 120 and fixed node 110 is the movement and distance of the mobile node 120 relative to the fixed node 110. Implementations of the present disclosure present a communication array with a combination of systems to allow for managing Doppler and framing impacts in a high speed, many to one or one to many network between mobile nodes 120 and fixed nodes 110. FIGS. 3A and 3B provide schematic views of exemplary architectures of the communication array 300 of a mobile node 120 (FIG. 3A) and a fixed node 110 (FIG. 3B). The communication array 300 includes antennas 310 that transmit/receive data packets 10 by emitting/receiving a series of electromagnetic signals 320. An electromagnetic signal 320 may include a corresponding signal frequency, representing a rate at which a base signal or carrier wave associated with the electromagnetic signal 320 occurs over a period of time, and a corresponding signal transmission period, representing a time at which the antennas 310 are transmitting the data packets 10. The signal frequency may also be representative of a channel used by the electromagnetic signal 320 within a given frequency band.

With continued reference to FIGS. 3A and 3B, a signal controller 330 controls the antennas 310 to emit electromagnetic signals 320 when transmitting data packets 10 and to receive electromagnetic signals 320 when receiving data packets 10. In the example shown, the signal controller 330 includes a time slot controller 332, a frequency controller 334, and a correction controller 336. The signal controller 330 receives (e.g., from another system or module of the same system) a current velocity 340 of the mobile node 120 and a current position 342 of the mobile node 120 relative to the fixed node 110. As used herein, the current position 342 may refer to a distance between the mobile node 120 and the fixed node 110. Moreover, while the term "mobile" implies the mobile node 120 is moving, the fixed node may be stationary (i.e., not moving) or may also be moving. Accordingly, when the signal controller 330 is located at the mobile node 120 (FIG. 3A), the signal controller 330 receives corresponding information related to the velocity 340 of the mobile node 120 and the position 342 of the mobile node 120 relative to the fixed node 110 prior to communicating with the fixed node 110. Similarly, when the signal controller 330 is located at the fixed node 110 (FIG. 3B), the signal controller 330 receives information about the velocity 340 of the mobile node 120 and the position 342 of the mobile node 120 (again, relative to the fixed node 110) prior to communicating with the mobile node 120.

When the signal controller 330 is scheduling transmission of data 10, the time slot controller 332 identifies or controls selection of a receive time slot ($t_{slot}$) that indicates an intended time for the transmission of the data 10 to be received by the receiving node 110, 120. The time slot controller 332 also determines a propagation delay ($t_{delay}$) for the transmission of the data 10 between the transmitting node (e.g., one of the fixed node 110 or the mobile node 120) and the receiving node (e.g., the other one of the fixed node 110 or the mobile node 120) based on the current position 342 of the mobile node 120 relative to the fixed node 110. For instance, in the example of FIG. 3A when the signal controller 330 at the mobile node 120 is scheduling transmission of data 10 (e.g., by emitting a corresponding series of one or more electromagnetic signals 320), the time slot controller 332 identifies the receive time slot ($t_{slot}$) indicating the intended time for the transmission of the data 10 from mobile node 120 to be received by the fixed node 110. On the other hand, in the example of FIG. 3B, the time slot controller 332 at the fixed node 110 identifies the receive time slot indicating the intended time for the transmission of data 10 from the fixed node 110 to be received by the mobile node 120. Accordingly, the time slot controller 332 determines the propagation delay (due to the speed of light c and the distance d) between the nodes 110, 120. For example, the propagation delay may be calculated as follows:

$$t_{delay} = \frac{d}{c} \quad (1)$$

As illustrated in FIG. 3A, the time slot controller 332 of the mobile node 120 may then determine a transmission time 350 ($t_{xmit}$) based on the intended receive time slot and the propagation delay. The time slot controller 332 may offset the transmission time 350 from the intended time slot by the propagation delay. That is, the mobile node 120 may transmit earlier than originally intended by a quantity equivalent to the propagation delay. Specifically, when the mobile node 120 is transmitting, the transmission time 350 may be calculated as follows:

$$t_{xmit} = t_{slot} - t_{delay} \quad (2)$$

As illustrated in FIG. 3B, the time slot controller 332 of the fixed node 110 may instead determine a reception time 360 (as opposed to the transmission time 350 of the mobile node 120 (FIG. 3A)) when the fixed node 110 is transmitting data 10 to the mobile node 120. The reception time 360 is the time slot that the mobile node 120 will receive the transmission from the fixed node 110. The reception time 160, in some examples, is set to a quantity of time equivalent to the propagation delay after the scheduled transmit time of the fixed node 110 (i.e., when the time slot the mobile node 120 will actually receive the transmission when the fixed node 110 transmits at its scheduled transmit time). Specifically, when the fixed node 110 is transmitting, the reception time 360 may be calculated as follows:

$$t_{receive} = t_{slot} + t_{delay} \quad (3)$$

The frequency controller 334 controls the transmission frequency of the data 10. Because of the relative velocity difference between the nodes 110, 120, the mobile node 120 will receive the data transmission at a different frequency than a frequency at which the data 10 was transmitted (i.e., a Doppler shift). To account for this change in frequency, the frequency controller 334 determines a Doppler shift ($f_{shift}$) for the transmission of the data 10 based on the current velocity 340 of the mobile node 120. Since the fixed node 110 could be stationary or moving, the current velocity 340 of the mobile node 120 relative to the fixed node 110 corresponds to a velocity difference ($v_{diff}$). Thus, the velocity difference could be the actual velocity of the mobile node 120 when the fixed node 110 is stationary, or when the fixed node 110 is also moving, the velocity difference is simply the difference in velocity between the mobile and fixed nodes 110, 120. For example, the Doppler shift may be calculated as follows:

$$f_{shift} = \frac{v_{diff}}{c} \quad (4)$$

The polarity of equation (3) indicates whether the mobile node 120 is moving toward or away from the fixed node 110. Referring back to FIG. 3A, when the mobile node 120 is transmitting, a transmission frequency 352 ($f_{xmit}$) is calculated using a base transmission frequency $f_{fixed}$ and the Doppler shift $f_{shift}$ as follows:

$$f_{xmit} = f_{fixed} - f_{shift} \quad (5)$$

The base frequency represents the original intended frequency of the data transmission while the Doppler shift represents a compensation of the frequency change due to Doppler shift. The combination of the base frequency and the Doppler shift results in the transmission frequency 352 by which the mobile node 120 will transmit the data 10. Referring now again to FIG. 3B, when the fixed node 110 is transmitting, a reception frequency 362 ($f_{receive}$) is calculated also using the base transmission frequency and the Doppler shift. The reception frequency, which represents the frequency by which the mobile node 120 will receive the data 10, may be calculated as follows:

$$f_{receive} = f_{fixed} + f_{shift} \quad (6)$$

During data transmission of the data packet 10, the mobile node 120 will continue to move away from or toward the fixed node 110. Therefore, the mobile node 120 will have a distance from the fixed node 110 at the beginning of the data transmission (the current position 342) that is different than a distance from the fixed node 110 at the end of the data transmission (an end position). Thus, the propagation delay changes throughout transmission of the data packet 10. The correction controller 336 compensates for this effect by accounting for the change in the propagation delay during transmission of the data packet 10. In some examples, the correction controller 336 estimates an end position of the mobile node 120. The end position is a position of the mobile node 120 relative to the fixed node 110 at the end of the transmission of the data packet 10 (i.e., the estimated future position of the mobile node 120 at the end of data transmission). For instance, when the mobile node 120 is the transmitting node and the fixed node 110 is the receiving node, the end position of the mobile node 120 corresponds to the estimated future position of the mobile node 120 at the time transmission of the data packet 10 from the mobile node 120 is received by the fixed node 110. The correction controller 336 then determines a difference $r_{change}$ between the current position 342 (i.e., the position at the beginning of the data transmission) and the end position. This difference $r_{change}$ introduces a framing error into the data transmission (i.e., how much data is received by the receiver node). In some implementations, compensation $t_{comp}$ for this framing error is calculated as follows:

$$t_{comp} = \frac{r_{change}}{c} \quad (7)$$

A clock rate correction $t_{comp}$ 354 may adjust a symbol rate of the data packet 10 in order to lengthen or shorten the transmission or reception of the data packet 10. That is, if the nodes 110, 120 are moving apart (i.e., $r_{change}$ is positive) and the mobile node 110 is transmitting (FIG. 3A), the clock rate correction 354 shortens the block transmission (i.e., the symbol rate is reduced). Alternatively, if the nodes 110, 120 are moving apart and the fixed node 110 is transmitting (FIG. 3B), the block reception is lengthened (i.e., the symbol rate is increased). On the other hand, if the nodes 110, 120 are moving closer together (i.e., $r_{change}$ is negative) and the mobile node 120 is transmitting (FIG. 3A), the clock rate correction 354 lengthens the block transmission. Likewise, if the fixed node 110 is transmitting (FIG. 3B) and the nodes 110, 120 are moving closer together, the block reception is shortened. Because the fixed node 110 and the mobile node 120 typically agree on a fixed block size, the symbol rate may be adjusted or compensated to have a symbol account equivalent to an uncorrected waveform. That is, the clock rate correction 354 may adjust the symbol rate such that the receiving node (mobile node 120 or fixed node 110) perceives the same symbol rate as the node would perceive if the position between the fixed node 110 and the mobile node 120 were fixed (i.e., the mobile node 120 was not moving).

If the mobile node 120 is accelerating such that the difference in Doppler shift and timing correction is beyond the tolerance of the receiving node (mobile node 120 or fixed node 110), the clock rate correction 354 may be performed multiple times within a single data packet 10 to correct each segment of the data packet 10 in order to ensure that the entire packet 10 is received within the processing limits. In some implementations, physical limitations of mobility of the mobile node 120 in relationship to block size may preclude clock rate correction, which may be determined in advance (through, for example, the same or similar process).

The fixed nodes 110 and mobile nodes 120 of FIG. 1-3B are exemplary only. The communication array 300 is suitable for communication between one or more fixed and mobile nodes 110, 120, including a mobile node 120 to a fixed node 110, a fixed node 110 to a mobile node 120, and a mobile node 120 to another mobile node 120. The node 110, 120 may be a network node (of which there may be many) or the node 110, 120 may be a central node (of which there may be one in communication with many network nodes). In order to minimize interference, transmissions may be designed to only be received by a single fixed node 110 (or central node) at a time (i.e., using highly directional antennas or only a single fixed node 110). This assures that transmissions do not interfere with any other synchronized fixed nodes 110. The present disclosure is especially effective with applications that are integrated into platforms that are very "self aware". For example, applications with highly reliable, and rapidly updated, position and state vector data, such as through with an inertial measurement unit (IMU) or high performance global position system (GPS). The communication array 300 simplifies the implementation of networks and avoids adding waveform overhead to address worst case conditions, and thus, enables effectively unlimited network velocities and accelerations. Specific tailoring may be applied in any one specific application depending upon the dynamics of the platforms involved. For example, when the acceleration between the nodes 110, 120 is low, no intra-block corrections may be required.

Figure 4:
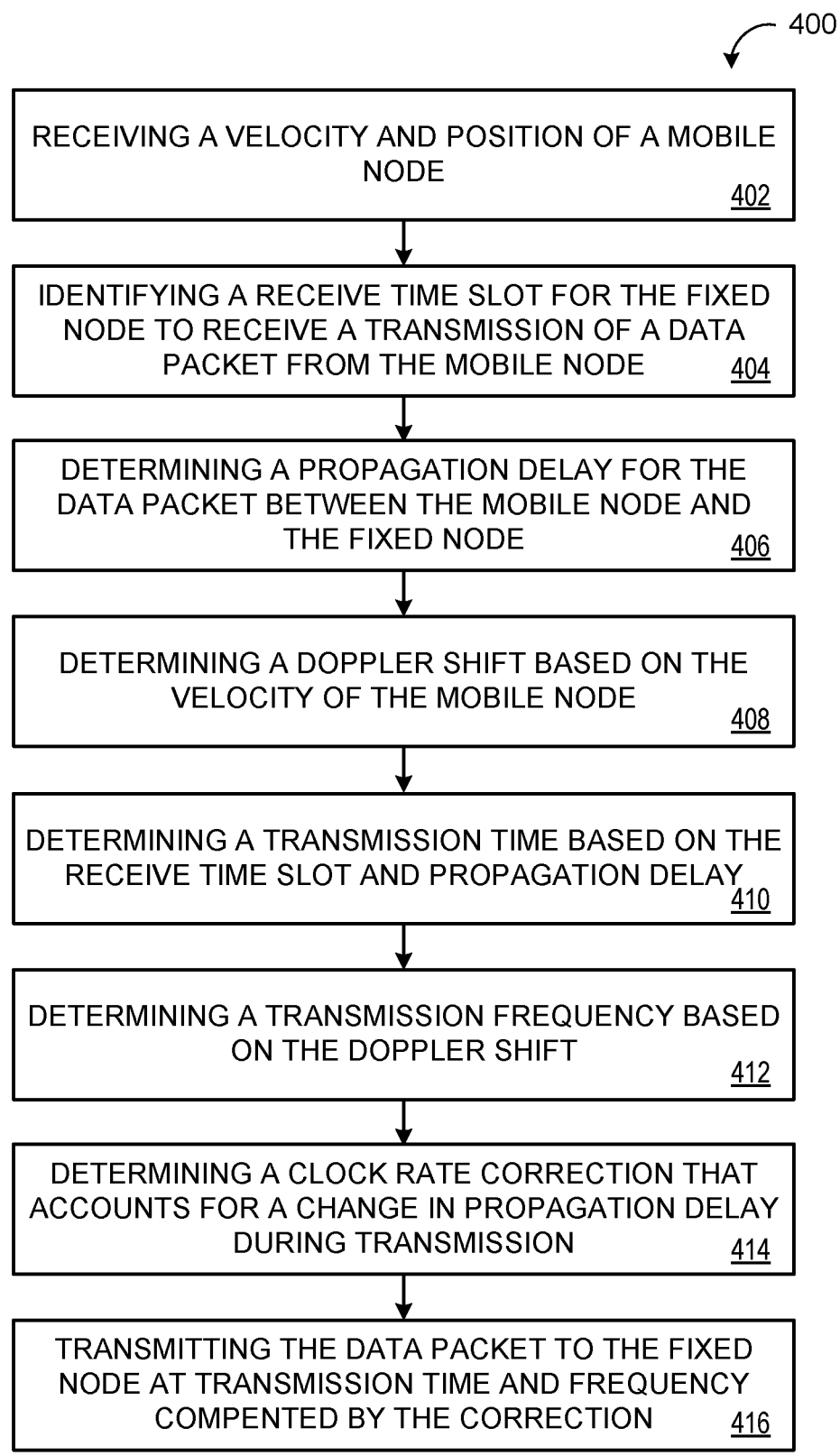
FIG. 4 is a flowchart of an example method for managing Doppler and framing impacts in networks.

FIG. 4 is a flowchart of an example method 400 for managing Doppler and framing impacts in networks. The flowchart starts at operation 402 by receiving, at data processing hardware 312 of a mobile node 120, a current velocity 340 of the mobile node 120 and a current position 342 of a mobile node 120 relative to a fixed node 110. The mobile node 120 is moving toward or away from the fixed node 110. The method 400, at operation 404, includes identifying, by the data processing hardware 312, a receive time slot for the fixed node 110 to receive a transmission of a data packet 10 from the mobile node 120.

At operation 406, the method 400 includes determining, by the data processing hardware 312, a propagation delay for the data packet 10 between the mobile node 120 and the fixed node 110 based on the position 342 of the mobile node 120 relative to the fixed node 110 (e.g., the time slot controller 332 using Equation (1)).

The method 400, at operation 408, includes determining, by the data processing hardware 312, a transmission time 350 based on the identified receive time slot and the determined propagation delay. In some examples, determining the transmission time 350 includes the time slot controller 332 using Equation (2) to subtract the propagation delay from the identified receive time slot. At operation 410, the method 400 includes determining, by the data processing hardware 312, a Doppler shift based on the current velocity 340 of the mobile node 120 (e.g., the frequency controller 334 using Equation (4)). The method 400, at operation 412, includes determining, by the data processing hardware 312, a transmission frequency 352 based on the determined Doppler shift. In some implementations, determining the transmission frequency 352 includes adding, by the frequency controller 334 using Equation (5), a Doppler shift to a base transmission frequency or subtracting the Doppler shift from the base transmission frequency.

The method 400, at operation 414, includes determining, by the data processing hardware 312, a clock rate correction 354. The clock rate correction 354 accounts for a change in the propagation delay during transmission of the data packet 10. In some examples, determining the clock rate correction 354 includes estimating, by the correction controller 336, an end position of the mobile node 120, the end position corresponding to a position of the mobile node 120 relative to the fixed node 110 at the end of transmitting the data packet 10. Determining the clock rate correction 354 may also include determining a difference between the current position 342 of the mobile node 120 and the end position of the mobile node 120 and determining the clock rate correction 354 based on the determined difference between the current position 342 of the mobile node 120 and the end position of the mobile node 120 (e.g., Equation (7)). In some implementations, determining the clock rate correction 354 further includes adjusting a symbol rate of the data packet 10 based on the determined difference between the current position 342 of the mobile node 120 and the end position of the mobile node 120. The adjusted symbol rate may be equivalent to a symbol count of an uncorrected waveform.

At operation 416, the method 400 includes transmitting, by the data processing hardware 312, the data packet 10 to a fixed node 110 at the determined transmission time 350 using the determined transmission frequency 352 compensated by the determined clock rate correction 354.

Figure 5:
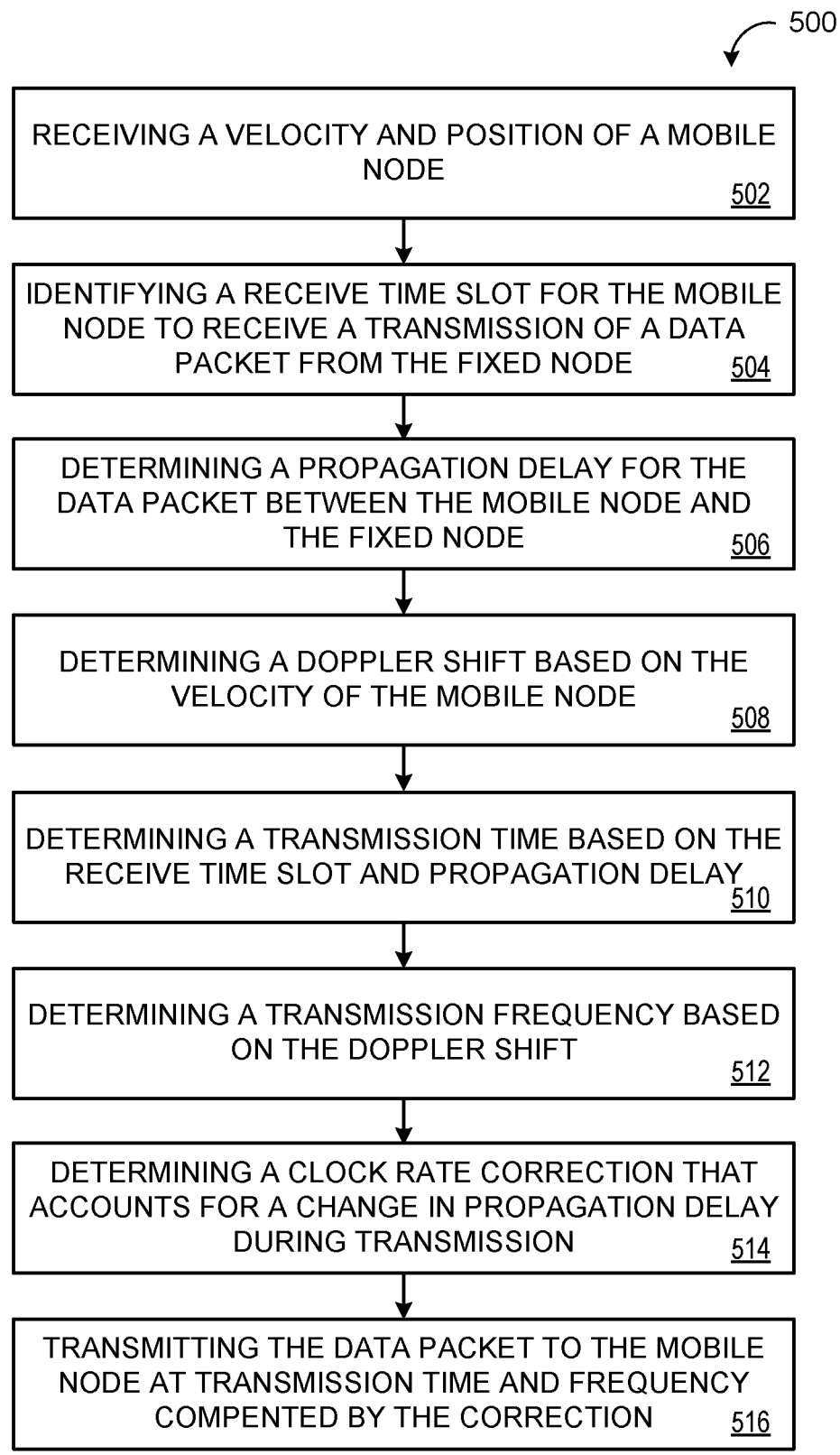
FIG. 5 is a flowchart for another example method for managing Doppler and framing impacts in networks.

FIG. 5 is a flowchart of another example method 500 for managing Doppler and framing impacts in networks. The flowchart starts at operation 502 by receiving, at data processing hardware 312 of a fixed node 110, a current velocity 340 of a mobile node 120 and a current position 342 of the mobile node 120 relative to the fixed node 110. The mobile node 120 is moving toward or away from the fixed node 110. The method 500, at operation 504, includes identifying, by the data processing hardware 312, a receive time slot for the mobile node 120 to receive a transmission of a data packet 10 from the fixed node 110.

At operation 506, the method 500 includes determining, by the data processing hardware 312, a propagation delay for the data packet 10 between the mobile node 120 and the fixed node 110 based on the position 342 of the mobile node 120 relative to the fixed node 110. In some implementations, the time slot controller 332 determines the propagation delay using Equation (1).

The method 500, at operation 508, includes determining, by the data processing hardware 312, a reception time 360 based on the identified receive time slot and the determined propagation delay. In some examples, determining the reception time 360 includes the time slot controller 332 using Equation (3) to add the propagation delay to the identified receive time slot. At operation 510, the method 500 includes determining, by the data processing hardware 312, a Doppler shift based on the current velocity 340 of the mobile node 120. For example, the frequency controller 334 may determine the Doppler shift using Equation (4). The method 500, at operation 512, includes determining, by the data processing hardware 312, a reception frequency 362 based on the determined Doppler shift. In some implementations, determining the reception frequency 362 includes adding a Doppler shift to a base reception frequency or subtracting the Doppler shift from the base reception frequency (e.g., Equation (6)).

The method 500, at operation 514, includes determining, by the data processing hardware 312, a clock rate correction 354. The clock rate correction 354 accounts for a change in the propagation delay during transmission of the data packet 10. In some examples, determining the clock rate correction 354 includes estimating an end position of the mobile node 120, the end position a position of the mobile node 120 relative to the fixed node 110 at the end of transmitting the data packet 10. Determining the clock rate correction 354 may also include determining a difference between the current position 342 of the mobile node 120 and the end position of the mobile node 120 and determining the clock rate correction 354 based on the determined difference between the current position 342 of the mobile node 120 and the end position of the mobile node 120. In some implementations, determining the clock rate correction 354 further includes adjusting a symbol rate of the data packet 10 based on the determined difference between the current position 342 of the mobile node 120 and the end position of the mobile node 120. For example, the correction controller 336 may determine the clock rate correction using Equation (7). The adjusted symbol rate may be equivalent to a symbol count of an uncorrected waveform.

At operation 516, the method 500 includes transmitting, by the data processing hardware 312, the data packet 10 to a mobile node 120 at the determined reception time 360 using the determined reception frequency 362 compensated by the determined clock rate correction 354.

Figure 6:
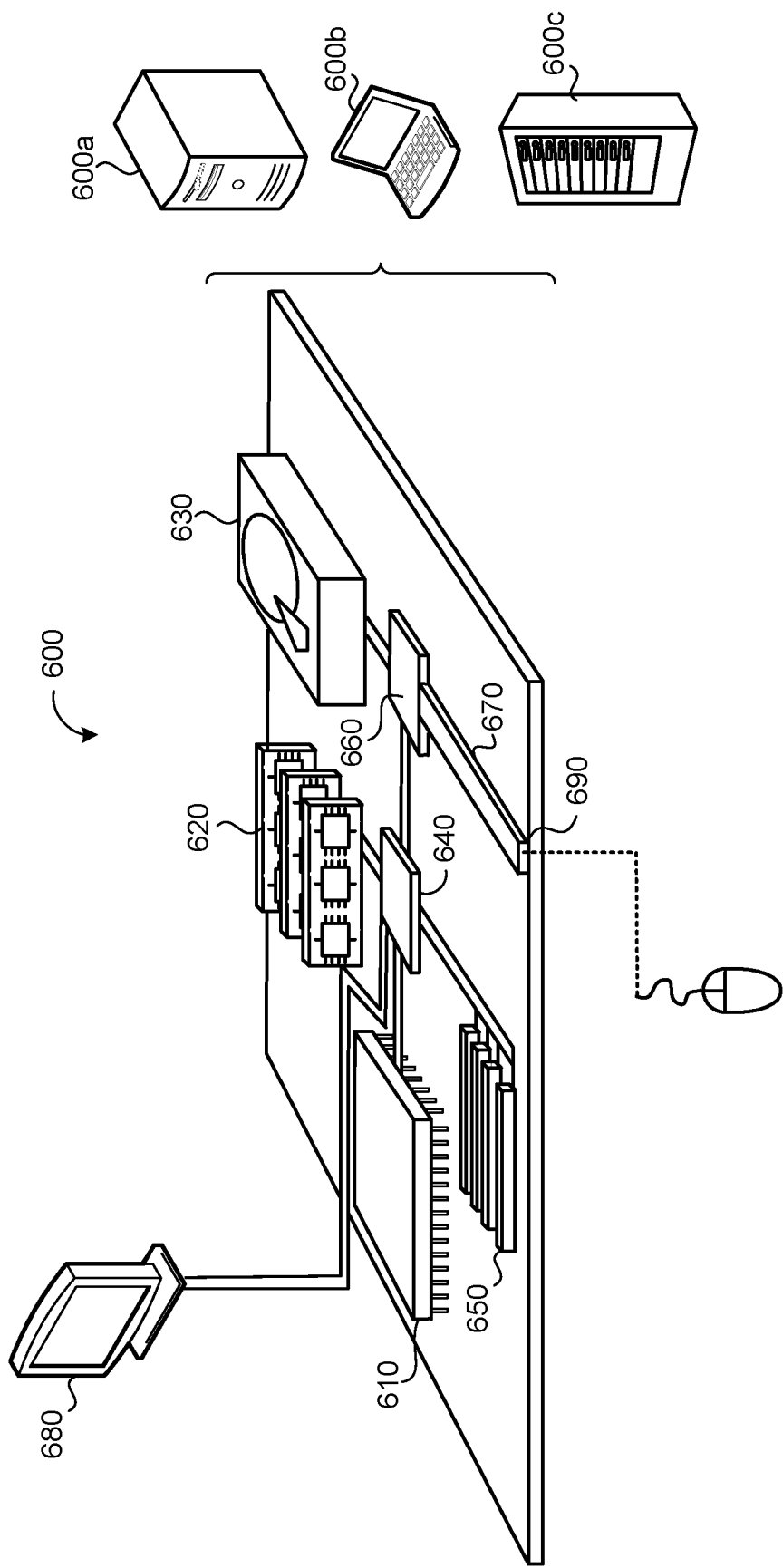
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A method comprising:
receiving, at data processing hardware of a mobile node, a current velocity of the mobile node and a current position of the mobile node relative to a fixed node, the mobile node moving toward or away from the fixed node;

identifying, by the data processing hardware, a receive time slot for the fixed node to receive a transmission of a data packet from the mobile node;

determining, by the data processing hardware, a propagation delay for the data packet between the mobile node and the fixed node based on the current position of the mobile node relative to the fixed node;

determining, by the data processing hardware, a transmission time based on the identified receive time slot and the determined propagation delay;

determining, by the data processing hardware, a Doppler shift based on the current velocity of the mobile node;

determining, by the data processing hardware, a transmission frequency based on the determined Doppler shift by adding the Doppler shift to a base transmission frequency or subtracting the Doppler shift from the base transmission frequency;

determining, by the data processing hardware, a clock rate correction, the clock rate correction accounting for a change in the propagation delay during transmission of the data packet; and transmitting, by the data processing hardware, the data packet to the fixed node at the determined transmission time using the determined transmission frequency compensated by the determined clock rate correction.

2. The method of claim 1, wherein determining the transmission time comprises subtracting the propagation delay from the identified receive time slot.

3. The method of claim 1, wherein determining the clock rate correction comprises:
estimating an end position of the mobile node, the end position a position of the mobile node relative to the fixed node at an end of transmitting the data packet;
determining a difference between the current position of the mobile node and the end position of the mobile node; and
determining the clock rate correction based on the determined difference between the current position of the mobile node and the end position of the mobile node.

4. The method of claim 3, wherein determining the clock rate correction further comprises adjusting a symbol rate of the data packet based on the determined difference between the current position of the mobile node and the end position of the mobile node.

5. The method of claim 4, wherein the adjusted symbol rate is equivalent to a symbol count of an uncorrected waveform.

6. A method comprising:
receiving, at data processing hardware of a fixed node, a current velocity of a mobile node and a current position of the mobile node relative to the fixed node, the mobile node moving toward or away from the fixed node;
identifying, by the data processing hardware, a receive time slot for the mobile node to receive a transmission of a data packet from the fixed node;
determining, by the data processing hardware, a propagation delay for the data packet between the fixed node and the mobile node based on the current position of the mobile node relative to the fixed node;
determining, by the data processing hardware, a reception time based on the identified receive time slot and the determined propagation delay;
determining, by the data processing hardware, a Doppler shift based on the current velocity of the mobile node;

determining, by the data processing hardware, a reception frequency based on the determined Doppler shift by adding the Doppler shift to a base reception frequency or subtracting the Doppler shift from the base reception frequency;

determining, by the data processing hardware, a clock rate correction, the clock rate correction accounting for a change in the propagation delay during transmission of the data packet; and transmitting, by the data processing hardware, the data packet to the mobile node at the determined reception time using the determined reception frequency compensated by the determined clock rate correction.

7. The method of claim 6, wherein determining the reception time comprises adding the propagation delay to the identified receive time slot.

8. The method of claim 6, wherein determining the clock rate correction comprises:
estimating an end position of the mobile node, the end position a position of the mobile node relative to the fixed node at an end of transmitting the data packet;
determining a difference between the current position of the mobile node and the end position of the mobile node; and
determining the clock rate correction based on the determined difference between the current position of the mobile node and the end position of the mobile node.

9. The method of claim 8, wherein determining the clock rate correction further comprises adjusting a symbol rate of the data packet based on the determined difference between the current position of the mobile node and the end position of the mobile node.

10. The method of claim 9, wherein the adjusted symbol rate is equivalent to a symbol count of an uncorrected waveform.

11. A system comprising:
data processing hardware of a mobile node; and
memory hardware in communication with the data processing hardware, the memory hardware storing instructions that when executed on the data processing hardware cause the data processing hardware to perform operations comprising:
receiving a current velocity of the mobile node and a current position of the mobile node relative to a fixed node, the mobile node moving toward or away from the fixed node;
identifying a receive time slot for the fixed node to receive a transmission of a data packet from the mobile node;
determining a propagation delay for the data packet between the mobile node and the fixed node based on the current position of the mobile node relative to the fixed node;
determining a transmission time based on the identified receive time slot and the determined propagation delay;
determining a Doppler shift based on the current velocity of the mobile node;
determining a transmission frequency based on the determined Doppler shift by adding the Doppler shift to a base transmission frequency or subtracting the Doppler shift from the base transmission frequency;
determining a clock rate correction, the clock rate correction accounting for a change in the propagation delay during transmission of the data packet; and transmitting the data packet to the fixed node at the determined transmission time using the determined transmission frequency compensated by the determined clock rate correction.

12. The system of claim 11, wherein determining the transmission time comprises subtracting the propagation delay from the identified receive time slot.

13. The system of claim 11, wherein determining the clock rate correction comprises:
   estimating an end position of the mobile node, the end position a position of the mobile node relative to the fixed node at an end of transmitting the data packet;
   determining a difference between the current position of the mobile node and the end position of the mobile node; and
   determining the clock rate correction based on the determined difference between the current position of the mobile node and the end position of the mobile node.

14. The system of claim 13, wherein determining the clock rate correction further comprises adjusting a symbol rate of the data packet based on the determined difference between the current position of the mobile node and the end position of the mobile node.

15. The system of claim 14, wherein the adjusted symbol rate is equivalent to a symbol count of an uncorrected waveform.

16. A system comprising:
   data processing hardware of a fixed node; and
   memory hardware in communication with the data processing hardware, the memory hardware storing instructions that when executed on the data processing hardware cause the data processing hardware to perform operations comprising:
      receiving a current velocity of a mobile node and a current position of the mobile node relative to the fixed node, the mobile node moving toward or away from the fixed node;
      identifying a receive time slot for the mobile node to receive a transmission of a data packet from the fixed node;
      determining a propagation delay for the data packet between the fixed node and the mobile node based on the current position of the mobile node relative to the fixed node;
      determining a reception time based on the identified receive time slot and the determined propagation delay;
      determining a Doppler shift based on the current velocity of the mobile node;
      determining a reception frequency based on the determined Doppler shift by adding the Doppler shift to a base reception frequency or subtracting the Doppler shift from the base reception frequency;
      determining a clock rate correction, the clock rate correction accounting for a change in the propagation delay during transmission of the data packet; and
      transmitting the data packet to the mobile node at the determined reception time using the determined reception frequency compensated by the determined clock rate correction.

17. The system of claim 16, wherein determining the reception time comprises subtracting the propagation delay from the identified receive time slot.

18. The system of claim 16, wherein determining the clock rate correction comprises:
   estimating an end position of the mobile node, the end position a position of the mobile node relative to the fixed node at an end of transmitting the data packet;
   determining a difference between the current position of the mobile node and the end position of the mobile node; and
   determining the clock rate correction based on the determined difference between the current position of the mobile node and the end position of the mobile node.

19. The system of claim 18, wherein determining the clock rate correction further comprises adjusting a symbol rate of the data packet based on the determined difference between the current position of the mobile node and the end position of the mobile node.

20. The system of claim 19, wherein the adjusted symbol rate is equivalent to a symbol count of an uncorrected waveform.

* * * * *